(12) United States Patent
Ershag et al.

(10) Patent No.: US 10,738,244 B2
(45) Date of Patent: Aug. 11, 2020

(54) APPARATUS FOR RECYCLING CARBON AND HYDROCARBON FROM ORGANIC MATERIAL THROUGH PYROLYSIS

(71) Applicant: SES IP AB, Goeteborg (SE)

(72) Inventors: Bengt-Sture Ershag, Hortlax (SE); Olov Ershag, Noedinge (SE)

(73) Assignee: SES IP AB, Goeteborg (SE)

( * ) Notice: Subject to any disclaimer, the term of this patent is extended or adjusted under 35 U.S.C. 154(b) by 126 days.

(21) Appl. No.: 15/308,500

(22) PCT Filed: May 19, 2015

(86) PCT No.: PCT/SE2015/050559
§ 371 (c)(1),
(2) Date: Nov. 2, 2016

(87) PCT Pub. No.: WO2015/178833
PCT Pub. Date: Nov. 26, 2015

(65) Prior Publication Data
US 2017/0073582 A1 Mar. 16, 2017

(30) Foreign Application Priority Data
May 20, 2014 (SE) ....................................... 1450593

(51) Int. Cl.
*C10B 49/02* (2006.01)
*C10B 1/04* (2006.01)
(Continued)

(52) U.S. Cl.
CPC ................ *C10B 49/02* (2013.01); *C10B 1/04* (2013.01); *C10B 27/06* (2013.01); *C10B 53/00* (2013.01); *C10B 53/07* (2013.01); *Y02P 20/143* (2015.11)

(58) Field of Classification Search
CPC ....................................................... C10B 1/04; C10B 27/06; C10B 49/02; C10B 53/00; C10B 53/07; Y02P 20/143
See application file for complete search history.

(56) References Cited

U.S. PATENT DOCUMENTS

| | | | | |
|---|---|---|---|---|
| 698,129 | A | * | 4/1902 | Niese .................. F26B 17/1416 |
| 1,509,275 | A | * | 9/1924 | Wallace .................... C10B 1/04 202/124 |

(Continued)

FOREIGN PATENT DOCUMENTS

| | | | | |
|---|---|---|---|---|
| GB | 239069 | A * | 9/1925 | ............... C10B 1/04 |
| GB | 509966 | * | 7/1939 | ............ C10B 49/04 |
| SE | 531785 | C2 | 8/2009 | |

OTHER PUBLICATIONS

International Searching Authority, International Search Report and Written Opinion for International Application No. PCT/SE2015/050559, dated Aug. 13, 2015, 10 pages, Swedish Patent and Registration Office, Sweden.

*Primary Examiner* — Jonathan Miller
*Assistant Examiner* — Gabriel E Gitman
(74) *Attorney, Agent, or Firm* — Alston & Bird LLP

(57) ABSTRACT

The present invention concerns an arrangement for the recycling of carbon and hydrocarbon compounds from organic input material through pyrolysis treatment, comprising: a reactor (1) comprising a chamber (110) that is limited by a jacket (111) and upper and lower end-wall sections (112, 113), in which chamber input material (M) in fragmented form is intended to be introduced, gas inlet means (120) for the supply of heated inert gas (101) to the input material, whereby the gas inlet means (120) is connected in a manner that transfers gas to a gas emission source (102) through inlet pipes (104, 129, 187.1, 187.2) that are associated with inlet pipes, and gas outlets (160) for leading the gas out of the chamber, where the gas outlet means (120)

(Continued)

comprises openings (125, 146, 155, 185) through which gas flows intended to supply the gas (101) into the chamber (110), whereby the openings (125, 146, 155, 185) through which gas flows are arranged such that a fall in pressure dP is generated during the supply of gas that exceeds the fall in pressure dM of the gas during passage through the input material M that has been introduced into the chamber. The invention concerns also a method for the recycling of carbon and hydrocarbon compounds from organic input material through pyrolysis.

37 Claims, 6 Drawing Sheets

(51) Int. Cl.
    *C10B 53/07*   (2006.01)
    *C10B 53/00*   (2006.01)
    *C10B 27/06*   (2006.01)

(56) References Cited

U.S. PATENT DOCUMENTS

| | | | | |
|---|---|---|---|---|
| 1,748,187 A * | 2/1930 | Ott | ............ | C10B 21/22 202/135 |
| 1,772,819 A * | 8/1930 | Schumacher | ............ | C10B 1/04 48/86 R |
| 1,843,174 A * | 2/1932 | Records | ............ | C10B 1/04 202/99 |
| 2,655,470 A * | 10/1953 | Clark | ............ | C10B 7/14 202/99 |
| 4,003,683 A * | 1/1977 | Powell, Jr. | ............ | F23G 5/0276 264/13 |
| 4,030,984 A * | 6/1977 | Chambers | ............ | C10B 47/44 201/16 |
| 4,152,843 A * | 5/1979 | Kemmetmueller | ..... | C10B 39/02 239/456 |
| 4,407,700 A * | 10/1983 | Davis | ............ | C10B 1/04 201/17 |
| 4,550,669 A * | 11/1985 | Foresto | ............ | F23G 5/002 110/208 |
| 5,435,890 A * | 7/1995 | Munger | ............ | C10B 49/02 201/25 |
| 6,271,427 B1 | 8/2001 | Ershag | | |
| 8,419,812 B2 * | 4/2013 | Ershag | ............ | C10B 1/04 48/67 |
| 8,945,348 B2 * | 2/2015 | Loiseau | ............ | C10B 49/02 201/29 |
| 2011/0284358 A1 | 11/2011 | Jeon | | |
| 2017/0073582 A1 * | 3/2017 | Ershag | ............ | C10B 53/07 |

\* cited by examiner

APPARATUS FOR RECYCLING CARBON AND HYDROCARBON FROM ORGANIC MATERIAL THROUGH PYROLYSIS

CROSS REFERENCE TO RELATED APPLICATIONS

This application is a National Stage Application, filed under 35 U.S.C. § 371, of International Application No. PCT/SE2015/050559, filed May 19, 2015, which application claims priority to Swedish Application No. 1450593-7, filed May 20, 2014; the contents of both of which as are hereby incorporated by reference in their entirety.

BACKGROUND

Related Field

The present invention concerns an arrangement and a process for the recycling of carbon and hydrocarbon compounds from organic material through pyrolysis.

Description of Related Art

During pyrolysis, organic input material is heated in the absence of oxygen whereby the material, instead of being combusted, is converted to simpler components in the form of products in fluid and gaseous forms that are recovered through a sequence of subsequent process steps that includes, among other things, condensation. Following complete pyrolysis, known as "carbonisation", exclusively carbon remains.

Before the pyrolysis process, the input material is fragmented to particles of an appropriate size, washed, and preheated to approximately 100-150° C., after which the material is introduced into a reactor similar to a furnace for conversion to gas, which normally takes place at temperatures of approximately 450-700° C. A volatile gas, known as "pyrolysis gas", is obtained from the pyrolysis process, which gas contains, in addition to water vapour, carbon monoxide, carbon dioxide, paraffins, olefins, and a number of hydrocarbon compounds from which oil and gas can be recovered. Carbon black or active carbon can be produced from the solid carbon-containing residue in the reactor after the pyrolysis process. The pyrolysis products that are obtained are very valuable as industrial raw materials, and normally have qualities that are fully comparable to those of corresponding raw materials produced in a conventional manner.

Different types of pyrolysis arrangement are available, some of which are continuous processes in which organic material is supplied to a reactor with a displaceable bed that is transported through a drum in which heat is supplied to the material directly or indirectly. Another type of pyrolysis arrangement is such an arrangement in which a reactor that works in batches is supplied with organic input material in batches, whereby the reactor is sealed and pyrolysis of the material is carried out by the supply of heated inert gas. One example of such an arrangement is revealed in SE 531785.

Experience has shown that this process has many advantages, one of which is that it is simpler to monitor and control the operating parameters during the process. It is described in SE 531785 how the gas is led through the material bed from a centrally arranged gas distribution pipe to gas outlets arranged at the bottom of the reactor, whereby the amount of gas supplied is regulated through a series of inlet units arranged in the gas distribution pipe and where the direction of gas flow is controlled through regulation of the gas outlets where the pyrolysis gas is led out.

During the pyrolysis process described in SE531785, the reactor is initially filled with input material that forms a material bed that sinks down during the processing, and the partially processed input material in this way becomes more compact. It occurs that some regions in the bed of input material or certain particles of material are unevenly processed. Such uneven processing influences the direction of flow of the gas in the material since the gas flows follow the path of lowest resistance, which risks having a negative influence on the pyrolysis since the duration of the process is extended with increased process costs as a consequence.

Condensed pyrolysis oil collects in a trough arranged at the bottom of the reactor during the pyrolysis. It has proved to be important to minimise the contents of residues of non-vapourised oil and condensed carbon-containing material residues of pyrolysis oil, since this has a detrimental influence on the quality of the product.

The gas distribution pipe that is described in SE 531785 leads to improved control of the gas flow through the input material and better monitoring of the gas supply to the reactor than other previously known arrangements, but there is a need to improve further the control and regulation possibilities of the operating conditions and parameters inside the reactor itself in order to overcome difficulties and problems that arise in relation to the prior art technology.

BRIEF SUMMARY

One purpose of the invention is to achieve an arrangement for the recycling of carbon and hydrocarbon compounds from organic input material through pyrolysis that makes possible a more efficient and more complete pyrolysis of the input material supplied than prior art arrangements.

Other purposes of the invention are to achieve an arrangement for the recycling of carbon and hydrocarbon compounds from organic input material through pyrolysis that makes possible an even distribution of gas in the input material in the reactor, improved control of the flow of gas through the input material, and an efficient supply of heat to the complete bed of input material during the complete processing period during which pyrolysis takes place.

The purposes described above are achieved with an arrangement for the recycling of carbon and hydrocarbon compounds from organic input material through pyrolysis with the features that are specified in claim 1 and with the method steps that are specified in the method according to claim 32.

The advantage of the arrangement according to the invention is that a fall in pressure is generated across the openings through which gas flows in the gas inlet unit that exceeds the fall in pressure of the gas in the bed of input material, whereby an even distribution of the gas supplied to the input material is achieved. This leads also to the temperature in the input material becoming more even and able to be more accurately monitored, which prevents or at least reduces the risk that some regions in the bed of material or certain particles of material are unevenly processed. In this way, more even processing of the input material is achieved, and a more complete pyrolysis is carried out.

A further advantage of the arrangement according to the invention is that, by supplying the gas from a centrally arranged gas distribution pipe and from gas inlet units arranged at the bottom of the reactor chamber, a significantly more even and more efficient distribution of gas is obtained than in prior art reactors. The gas is led from gas inlet units both radially, obliquely and diagonally to gas outlet units arranged at the jacket or upper end of the reactor, and the gas in this way passes through a large volume of the input material in a short period, and the processing will be efficient. A further advantage with arranging gas inlets at the bottom of the chamber is that the flow of gas through the material in the lower part of the bed can be separately monitored and increased if required.

A further advantage is that the gas that is supplied has only a very short retention time in the reactor chamber during which heat is emitted to the input material, and this leads to the vapourised pyrolysis oil also leaving the reactor rapidly, and recondensation of the oil is prevented.

A further advantage is that the gas is led out from the chamber through outlet units arranged on the jacket, whereby efficient control of the flow of gas through the input material is achieved. The outlet units are equipped with control means such that the direction of the flow of gas can be monitored. The design of the outlet units prevents also that the vapourised pyrolysis oil recondenses in the input material.

A further advantage of the arrangement according to the invention is that the more efficient pyrolysis of the input material gives an end product that essentially lacks residues of volatile gases (odour), i.e. a product that essentially is not constituted by coke but consists of pure carbon (carbon black), and in which essentially all oil that is produced from the input material has been vapourised and removed from the reactor together with the process gas emitted.

Further distinctive features and advantages of the invention are made clear by the non-independent claims.

BRIEF DESCRIPTION OF THE FIGURES

The invention will be described in more detail below with reference to the attached drawings, which show:

FIG. 2a shows a view in section of a detail of the gas distribution pipe.

FIG. 3a shows a detail of the bottom of the chamber.

DETAILED DESCRIPTION OF VARIOUS EMBODIMENTS

Figure 1:
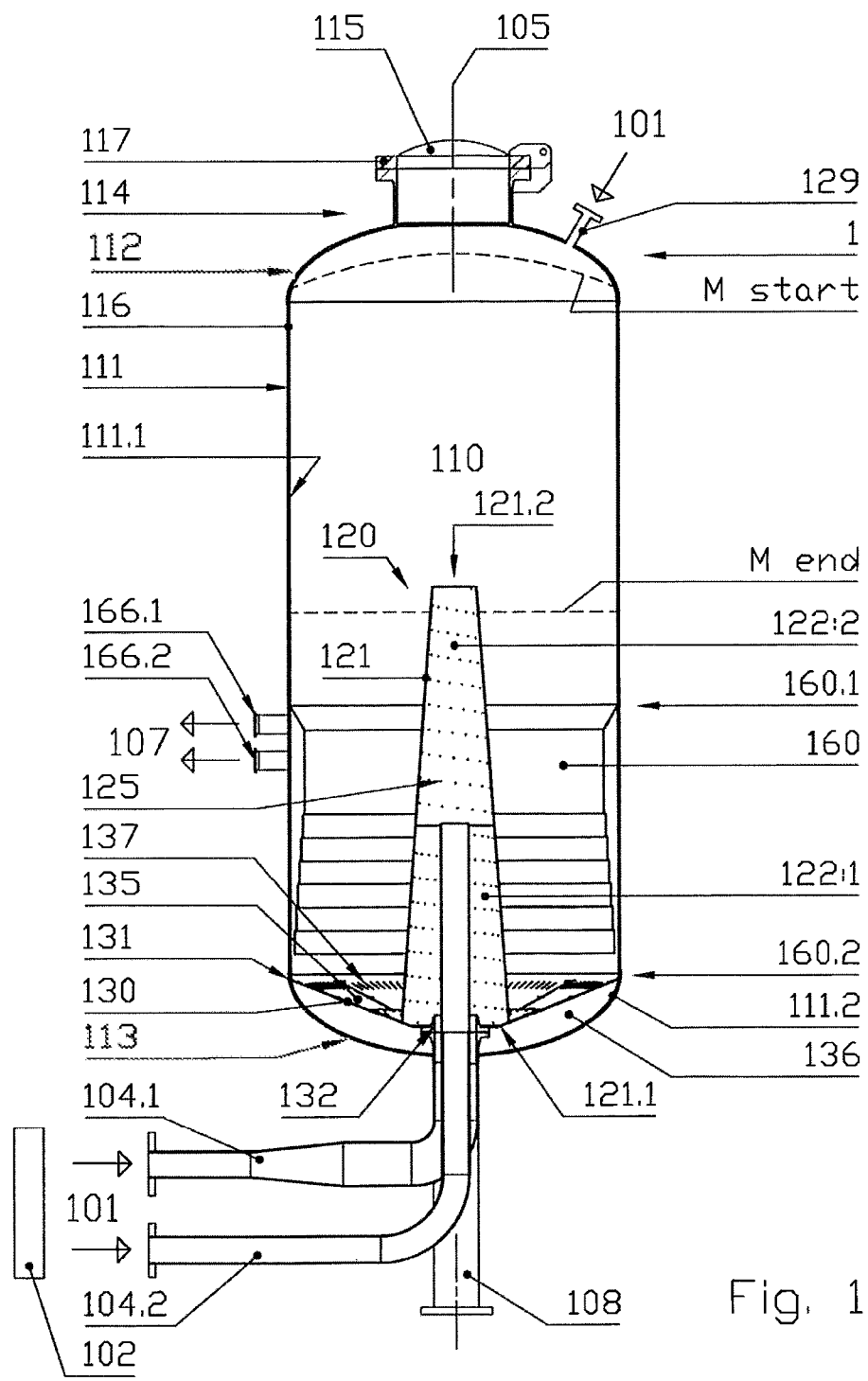
FIG. 1 shows schematically an embodiment of the arrangement according to the invention in a cut-away view.

FIG. 1 shows an arrangement according to the invention for the recycling of carbon and hydrocarbon compounds from organic input material by pyrolysis. The arrangement (shown in cut-away view) comprises a reactor 1 that functions in a batchwise manner designed as a vessel with a chamber 110 that is intended to receive input material in fragmented form. The reactor vessel 1 is manufactured from stainless steel or similar material that can resist high temperatures, and demonstrates the form of an extended vertically standing circular cylinder whose height exceeds its diameter. The vessel of the reactor is supported by a number of leg-like supports 108.

The chamber 110 outwardly limited by a jacket 111 formed from a surrounding circularly cylindrical wall that is arranged concentric to a vertical central axis 105 that extends through the reactor. The chamber 110 is further limited by an upper end-wall section 112 and a lower end-wall section 113, each one of which is principally perpendicular to the central axis 105 and parallel to each other.

The input material M may consist of any finely divided material at all that contains organic substances that are appropriate for pyrolysis. Such material may be constituted by organic material of various origins, not only new, unprocessed material but also previously used material that contains organic material intended to be recovered. Such material is constituted by, for example, fragmented rubber material of discarded tyres or other plastic material. The arrangement is appropriate also for the pyrolysis of substances and fragmented material during the recycling of electronic components, household machines and similar. Also waste from industries that work with rubber products is suitable for processing in the arrangement for the recycling of component substances and the production of carbon black and pyrolysis oil.

The upper end-wall section is designed with an opening that can be closed, general denoted by 114. The opening comprises a hatch 115 that can be opened automatically equipped with locking means 117 with which it is possible to lock the hatch 115 against the upper end-wall section 112 in a closed condition that is gastight against the surrounding atmosphere. The input material M is introduced to the reactor chamber 110 through the opening, and the chamber is initially filled before the process starts to at least 75%, indicated in FIG. 1 by $M_{start}$. The input material has sunk to a lower level, indicated by $M_{end}$ at the end of the processing.

The reactor has further gas inlet units 120 for the supply of an inert or inactive heated gas 101 under pressure from a gas emission source 102 through inlet pipes 104.1 and 104.2 to the chamber 110 for pyrolysis of the input material. The gas inlet units 120 may be designed in various ways that are displayed and described below. The reactor has also gas outlet units 160 for the passage of gas out from the chamber.

FIG. 1 shows that the gas inlet units 120 comprise a gas distribution pipe 121. FIG. 1 shows further that the inlet pipes 104.1 and 104.2 of the gas inlet unit are located concentrically with each other (one inside the other), and that they run upwards through the lower end-wall section 113 of the reactor 1. The inlet pipes 104.1 and 104.2 undergo a transition into a common central gas distribution pipe 121 that extends axially as a tower into the chamber 110, preferably such that it coincides axially with the central axis.

The gas distribution pipe 121 is arranged with a lower end 121.1 united in a gastight manner with a bottom surface 135 and an upper end 121.2 arranged at a height that is at least half of the reactor height. It is preferable that the upper end 121.2 of the gas distribution pipe is arranged at a level that is higher than half of the reactor height, preferably up to ⅔ of the height of the chamber, such that the gas is to be supplied to the input material M in an even and efficient manner.

The gas distribution pipe 121 comprises at least one inlet unit arranged in the chamber, but it is conceivable that the gas distribution pipe be divided into several inlet units, depending on the size of the reactor and the nature of the input material. The gas distribution pipe shown in FIG. 1 is divided into a first lower inlet unit 122:1 and a second upper inlet unit 122:2 arranged at different levels in the vertical direction in the reactor chamber along the central axis 105 whereby the inlet pipes 104.1 and 104.2 are terminated at the inlet units 122.1 and 122.2, respectively. The number of inlet pipes is adapted according to the number of inlet units. The inner inlet pipe 104.2 opens out into the upper inlet unit 122:2, and the outer inlet pipe 104.1 opens out into the lower inlet unit 122.1. The design and construction are considerably simplified by having only two inlet units, compared with prior art technology.

In the reactor shown in FIG. 1, the upper end 121.2 of the gas distribution pipe is arranged at a level that is higher than half of the reactor height. This is advantageous since the inlet units 122.1 and 122.2 of the gas distribution pipe can then operate during the complete process. The input material $M_{start}$ initially covers the upper end 121.2 of the gas distribution pipe: by the final phase of the process the material has fallen to a level $M_{end}$ with the upper end of the gas distribution pipe 121.

Figure 2:
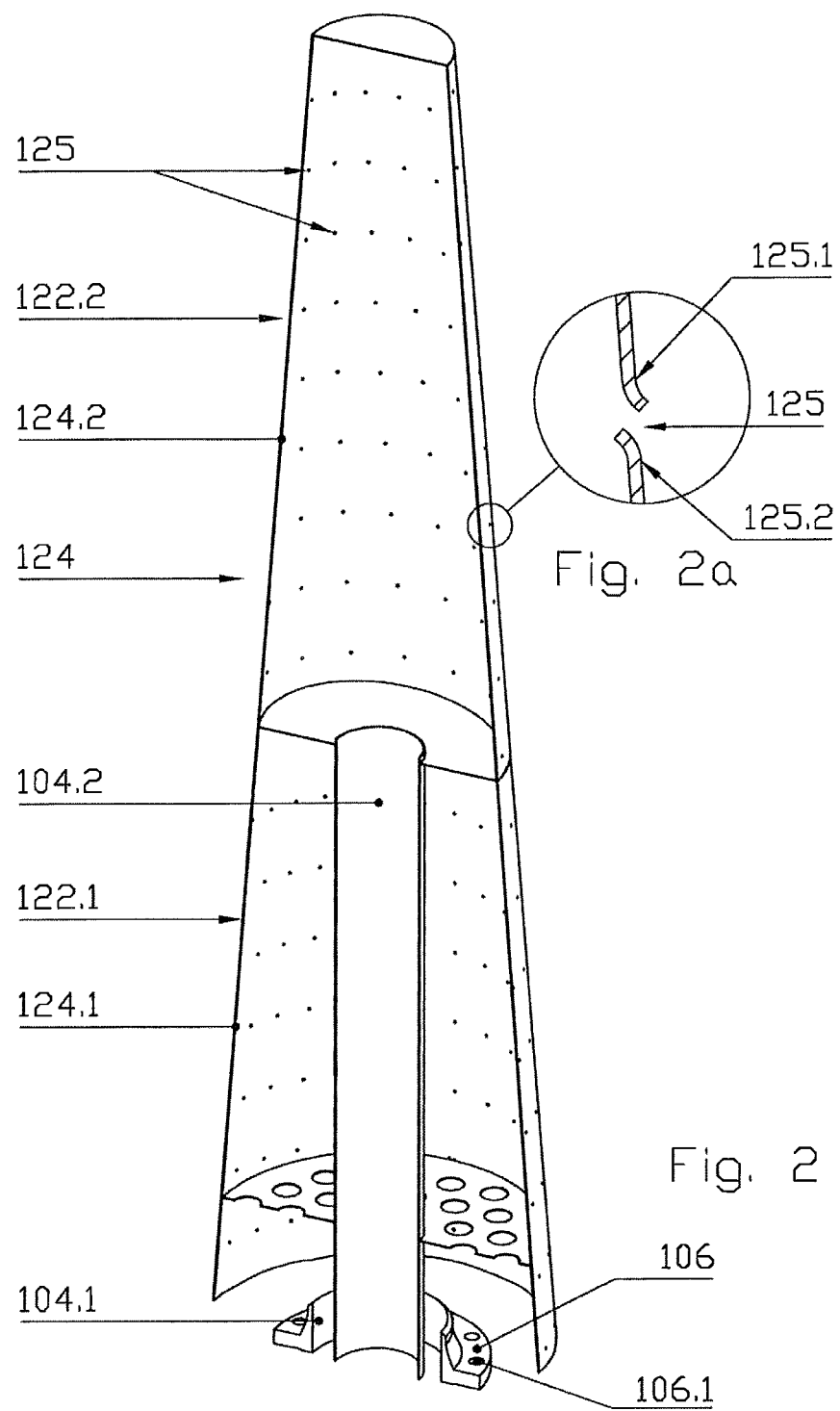
FIG. 2 shows schematically a gas distribution pipe arranged in the reactor according to the invention.

FIG. 2 shows the gas distribution pipe 121 in detail. The gas distribution pipe has a peripheral surface 124. Each inlet unit 122.1 and 122.2 demonstrates the form of a truncated circular cone with a diameter that decreases from the lower end to the upper end and with a jacket or peripheral surface 124.1 and 124.2, respectively. The inlet units 122.1 and 122.2 are designed to be stapled one on top of the other: the second inlet unit 122.2 is shown in FIG. 2 stapled on top of the first inlet unit 122.1, such that they are arranged on mutually different levels of height in the chamber 110. The inlet units together form the gas distribution pipe 121, which is in this way given a conical form. The input material M collapses together during the processing, whereby the volume of input material is reduced, but since the gas distribution pipe has a conically formed peripheral surface, the input material will be in contact with the peripheral surface 124 of the gas distribution pipe during the complete processing period, whereby the gas that is supplied to the material can process the input material efficiently. A further advantage of the conical form of the gas distribution pipe is that it leads to easier access to the carbon-based product at the bottom of the chamber during the emptying operation, through extraction by suction after the pyrolysis is complete.

The inlet units 122.1 and 122.2 of the gas distribution pipe demonstrate a set of openings or perforations 125 that are facing radially outwards towards the chamber 110 and through which gas flows, which openings are arranged continuously around the surrounding peripheral surface 124.1 and 124.2, respectively, of the relevant inlet units 122.1 and 122.2, and are intended to lead the inert gas that has been added from the gas emission source 102 to the input material M that has been introduced into the chamber. The gas distribution pipe shown in FIGS. 1 and 2 shows that the openings 125 through which gas flows are essentially evenly distributed over the peripheral surface 124 of the gas distribution pipe.

The openings have a total or a collective open area that does not exceed the cross-sectional area of the inlet pipe that is connected to the relevant inlet unit 122.1 and 122.2, such that a predetermined resistance to flow is obtained. A fall in pressure dP across the openings 125 of the inlet unit through which gas flows during the supply of the gas to the chamber is in this way generated. The resistance to flow of the openings is adapted such that the fall in pressure dP that is generated exceeds the fall in pressure dM of the gas that arises during the passage of the gas through the bed of input material. The resistance to flow of the openings leads to the gas that is supplied being spread and distributed evenly across all openings through which gas flows arranged on the peripheral surface 124.1 and 124.2, respectively, of the relevant inlet unit. The flow of gas from the relevant inlet unit 122.1 and 122.2 is in this way evenly distributed in the bed of material, instead of the gas flowing out from the gas distribution pipe principally in such directions in which the resistance to flow is low. The gas that has been supplied through the gas distribution pipe 121 passes essentially radially through the input material to gas outlet units 160 arranged on the inner surface 111.1 of the jacket.

Figure 3:
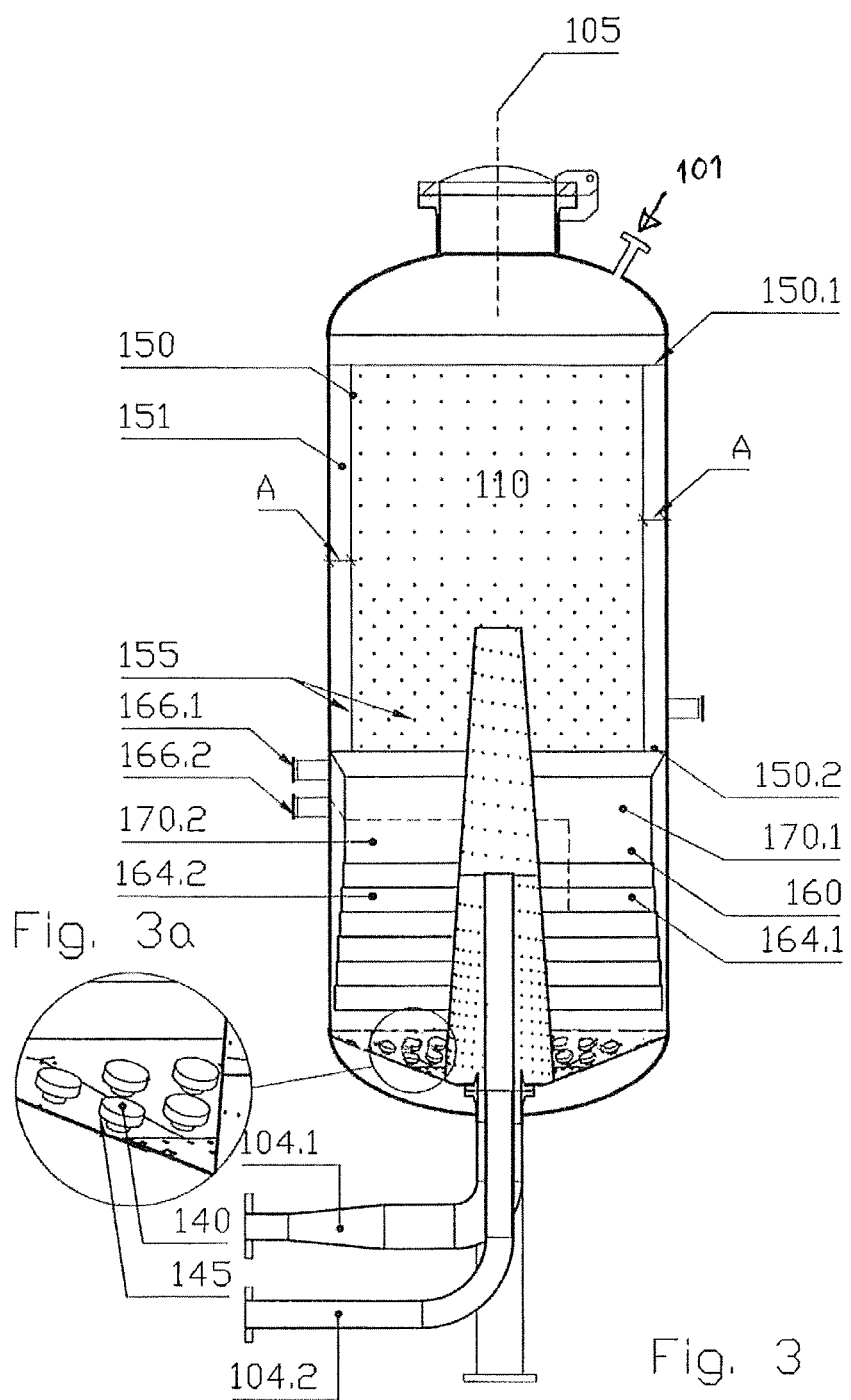
FIG. 3 shows schematically another embodiment of the reactor in a cut-away view.

The gas distribution pipe may be designed also as shown in FIG. 3 in which the openings 125 through which gas flows are distributed with an increasing number of openings in the downwards direction over the lower end of the gas distribution pipe, i.e. the lower part of the gas distribution pipe has more openings than the upper part. A larger fraction of the gas 101 that is supplied can in this way be introduced in a controlled manner to the input material M in the lower part of the chamber.

The input material M is initially essentially uniformly distributed in the chamber 110. The inert gas 101 under pressure that is supplied passes through the input material M that has been introduced into the chamber from gas inlet units 120 to gas outlet units 160. The flow of gas that passes through the material follows the path of lowest resistance to flow. The input material in the reactor chamber causes a fall in pressure in the gas that corresponds to the resistance to flow that the gas must overcome in order to pass through the material. The fall in pressure dM of the gas during passage through the input material M depends on the composition of the input material and the size distribution of the component fragments or particles of input material. The fall in pressure through the input material is determined or calculated for different compositions of the material and different size distributions. Experience has shown that input material with a fragment size of approximately 2-10 cm results in a fall in pressure of approximately 10 mBar. The resistance to flow in different regions of the input material changes during the pyrolysis treatment as the material undergoes pyrolysis and collapses together in the chamber. The resistance to flow through the input material increases in the lower part of the chamber. It is, therefore, advantageous to increase during the processing period the flow of gas to the input material that lies close to the bottom of the chamber.

The total outlet area of the openings 125 on the gas distribution pipe 121 through which gas flows can be distributed by variation of the size and number of the openings over the peripheral surface 124. It is preferable that the openings 125 be of the same shape and evenly distributed over the surrounding peripheral surface of the inlet units 122.1 and 122.2, as shown in FIG. 1. Another embodiment is shown in FIG. 3 in which the openings 125 are distributed over the surrounding periphery 124 of the gas distribution pipe such that the number of openings increases in the direction towards the lower end of the gas distribution pipe, i.e. the lower inlet unit 122.1 demonstrates a larger number of openings 125 through which gas flows than the upper inlet unit 122.2, with the purpose of increasing the flow of gas that is supplied to the input material M that is located close to the bottom of the chamber. The material is compressed during the process more rapidly in this region than in the upper part of the chamber, and it is for this reason advantageous to supply a larger flow of gas.

The pressure in the reactor chamber is normally approximately 1 Bar. The fall in pressure dP across the openings 125 through which gas flows in the relevant inlet unit 122.1 and 122.2 can be regulated during the pyrolysis process by control of the flow of gas supplied through the relevant inlet pipes 104.1 and 104.2, respectively. The fall in pressure dP in this way increases as the flow of gas increases. In order to achieve during pyrolysis an even supply of gas to the input material that has been introduced into the chamber, it is advantageous that the fall in pressure dP across the openings 125 of the gas inlet unit through which gas flows be approximately 3-20 times higher than the fall in pressure dM of the gas across the bed of input material. The fall in pressure dP across the openings of the unit through which gas flows is preferably 5-15 times higher than the fall in pressure across the input material. It is even more preferable that the fall in pressure dP be 10 times higher than the fall in pressure across the input material. This means in an operating situation that, when the fall in pressure across the input material is approximately 10 mBar, a fall in pressure across the openings 125 of the gas inlet unit through which gas flows corresponding to approximately 100 mBar is generated, which leads to the gas being evenly distributed across the peripheral surface of the inlet unit.

An opening 125 through which gas flows is shown in detail in FIG. 2a. The opening 125 demonstrates an upper edge part 125.1 that protrudes into the chamber 110 and a lower edge part 125.2 withdrawn in the inner surface of the gas distribution pipe 121 such that the opening 125 is directed downwards towards the bottom of the reactor. During the initial introduction of input material M into the chamber, and during the processing of the material, particles of input material pass and come into contact with the peripheral surface 124. In particular in cases in which the input material M contains metal parts or similar, it is advantageous to design the openings 125 through which gas flows in such a manner that such parts of the input material do not enter or become stuck in the openings during their passage and their coming into contact with the inlet units. Also other openings 155 and 185 through which gas flows located on the inlet wall surface 150 shown in FIG. 3 and the inlet surface 180 shown in FIG. 5 that are oriented essentially vertically can be designed in this manner.

It is further shown in FIG. 1 that a bottom plate 130 is arranged in the chamber 110 next to the lower end-wall section 113 where the bottom plate has an upwardly directed bottom surface 135 intended to support during pyrolysis the input material M that has been introduced into the chamber.

The bottom plate 130 extends between the end of the inlet pipe 104.1 and the inner surface of the jacket 111.1. The bottom plate has a circular external peripheral edge 131 that is connected in a gastight manner to the inner surface of the jacket, preferably in the region next to the transition 111.2 between the lower end-wall section 113 of the reactor and the cylindrical part 116 of the reactor jacket. The bottom plate 130 has a central circular opening with an inner peripheral edge 132 that surrounds and is connected in a gastight manner to the end of the inlet pipe 104.1. The bottom is preferably plane and arranged at an angle to the central axis 105 in order to form an obliquely downwardly directed bottom surface 135 that tilts inwards towards the central axis and that supports material, whereby the input material M that has been introduced into the chamber is automatically displaced in a direction towards the gas distribution pipe 121. The outer peripheral edge 131 of the bottom plate is in this way arranged at a vertically higher level than the inner peripheral edge 132 of the bottom plate. The bottom plate 130 may consist of 2-8 segments with the shape of an arc of a circle that are joined in a gastight manner along radially directed joints. A compartment 136 is in this way formed between the bottom plate 130 and the lower end-wall section 113 of the chamber.

It is shown in FIG. 1 that the bottom plate 130 comprises gas inlet means 120 designed as slits 137 that transfer gas arranged in the vicinity of the outer peripheral edge 131 of the bottom plate. The slits 137 are directed radially, have the same form, are arranged closely next to each other and at equal distances from the central axis. It is, of course, conceivable to distribute the slits evenly over the complete bottom plate. The slits that transfer gas slits are intended to supply gas to the input material that has been introduced into the chamber.

The advantage of arranging gas inlets next to the bottom of the chamber is that the gas is supplied to the input material from below, which leads to improved distribution of the gas and ensures that the gas flows non-radially through the input material, preferably obliquely or at an angle through the material. This contributes to increasing the efficiency of the pyrolysis. The gas that is supplied through the gas inlet means arranged at the bottom plate 130 passes obliquely or diagonally through the input material M to gas outlet means 160 arranged on the inner surface 111.1 of the jacket, which reduces the duration of processing and contributes in particular to pyrolysis of the input material that has already collapsed during the process.

Inlet pipes 104.2 are further shown in FIG. 2 that extend coaxially with the central axis through the lower inlet means 104.1 and open out into the upper inlet means 122.2 for the supply of gas to the inlet means. The lower inlet unit 122.1 is supplied with gas from the inlet pipe 104.1 that opens out into the lower end of the inlet unit and is connected to the inner peripheral edge 132 (not shown in the drawings) of the bottom plate with a flange 106 equipped with holes 106.1. The holes 106.1 open out into the compartment 136 under the bottom plate 130 and form passages that transfer gas that connect the lower inlet unit 122.1 with the compartment 136 under the bottom plate 130. The slits 137 of the bottom plate 130 and the lower inlet unit 122.1 of the gas distribution pipe have in this way a common inlet pipe 104.1. The gas that is supplied through the inlet pipe 104.1 is distributed in this way not only across the openings 125 of the inlet unit through which gas flows but also across the slits 137 of the bottom plate. This leads to good monitoring and good opportunities to control the flow of gas to the lower part of the reactor.

Figure 4:
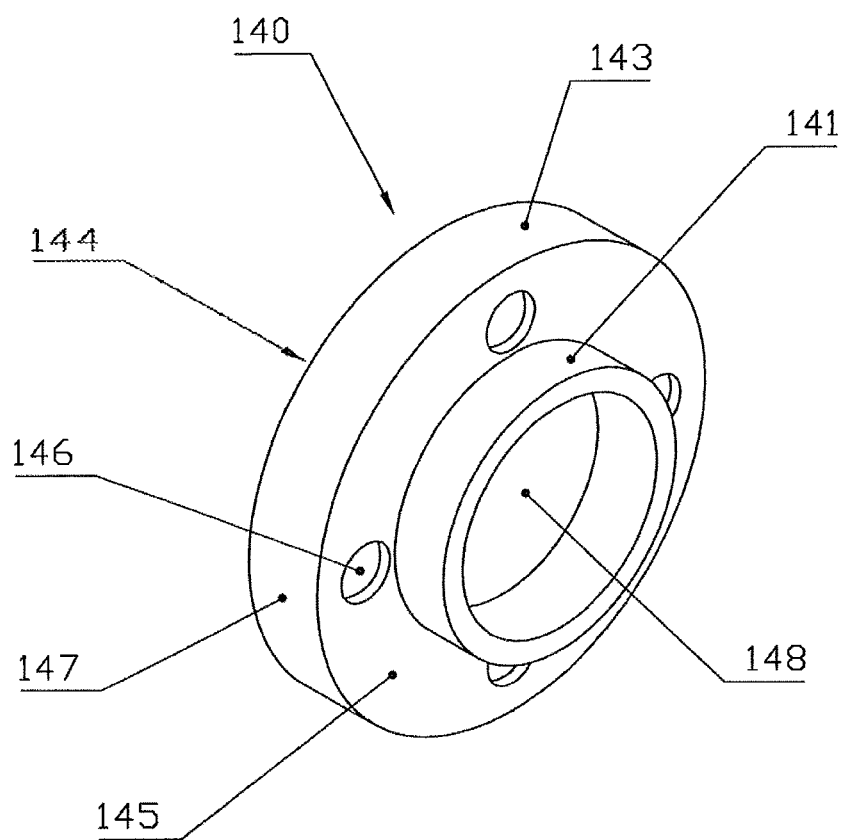
FIG. 4 shows a perspective view of a detail of the gas line arrangement.

FIG. 3 shows a second embodiment of the arrangement according to the invention in which the gas inlet means 120 of the reactor comprises a set of gas line arrangements 140 that demonstrate openings 146 through which gas flows (see also FIG. 4) that are arranged such that the gas can be supplied in an unimpeded manner to the input material M that has been introduced into the chamber. The gas line arrangement 140 has a lower part that is similar to a short pipe 141 intended to be connected perpendicularly to the bottom plate 130, and a circularly cylindrical upper part that is similar to a cover 143 connected to the pipe 141. The circularly cylindrical part, the cover 143, has a larger diameter than the pipe 141 and demonstrates a plane upper surface 144 to support material, which surface faces upwards and into the chamber and is intended that come into contact with the input material that has been introduced into the chamber. The circularly cylindrical part demonstrates also a lower surface 145 that faces the bottom plate 130 and is arranged parallel to the upper surface 144 that supports material. The lower surface 145 is provided the openings 146 through which gas flows directed downwards towards the bottom plate 130, such that penetration of particles of input material into the openings through which gas flows is prevented. The upper surface 144 of the cover that supports material and the lower surface 145 are united by a cylindrical edge part 147, whereby an internal hollow compartment 148 is formed between the side that supports material, the lower surface and the edge part. The lower part of the gas line arrangement, the pipe 141, connects a hole through which gas flows through the bottom plate (not shown in the drawings) with the openings 146 through which gas flows through the said internal hollow compartment 148 for the supply of heated inert gas to the input material that has been introduced into the chamber 110. The gas line arrangements 140 at the bottom plate and the compartment 136 are connected to the inlet pipe 104.1 through holes 106.1 and are supplied with gas in the same manner as has been previously described.

In order to achieve an even supply of gas to all gas line arrangements that are arranged at the bottom plate, the openings 146 through which gas flows in the gas line arrangement 144 are designed such that a predetermined resistance to flow is achieved for the gas during its passage through the openings whereby a fall in pressure dP is generated across the gas line arrangement 144 that exceeds the fall in pressure dM of the gas across the input material in the chamber 110.

It is preferable that the openings 146 through which gas flows in the gas line arrangements 140 are arranged such that the fall in pressure dP that is generated across the openings 146 through which gas flows in the gas line arrangements 140 on the bottom plate corresponds to the fall in pressure across the openings 125 through which gas flows in the inlet unit 122.1, such that an even distribution of gas takes place across the bottom plate and the lower part of the gas distribution pipe 121.

The flow of gas that is supplied to the input material from different positions in the chamber can be controlled simply by distributing the flow of gas differently to the inlet unit of the gas distribution pipe and the gas inlet means of the bottom plate. It is advantageous to supply, for example, 40% of the total flow of gas to the upper inlet unit 122.2 of the gas distribution pipe, and the remaining flow of gas to the lower inlet unit 122.1 and the gas line arrangements 140 of the bottom plate.

In a further embodiment (not shown in the drawings) the gas inlet means 120 of the bottom plate is connected in a manner that transfers gas to a gas emission source 102 through a separate associated inlet pipe (not shown in the drawings). The gas that is supplied to the gas inlet means at the bottom plate can then be monitored separately.

The reactor shown in FIG. 1 comprises also a gas inlet pipe 129 arranged at the jacket. The gas inlet pipe 129 is preferably arranged at the upper end-wall section 112 of the reactor. The gas inlet pipe 129 leads heated inert gas from a gas emission source 102 into the input material that has been introduced into the chamber. It is advantageous to supply gas from different directions: the input material undergoes pyrolysis more rapidly and the gas passes through the material in more directions, which contributes to more rapid processing and a more even distribution of heat in the material M.

FIG. 3 shows a further embodiment of the gas inlet means 120 of the reactor comprising an inlet wall surface 150 arranged on the inner surface 111.1 of the reactor jacket. The inlet wall surface is arranged continuously around the complete inner surface of the jacket at a distance A from the jacket, such that a compartment 151 that supplies gas is formed between the inlet wall surface 150 and the jacket 111. The inlet wall 150 has an upper end 150.1 arranged at the jacket next to the upper end-wall section 112, and a lower end 150.2 arranged in connection with the upper end of the outlet means. It is conceivable also that the lower end 150.2 of the inlet wall surface be arranged in connection with the bottom plate 130.

The inlet wall surface 150 is provided with opening 155 through which gas flows to lead heated inert gas 101 into the chamber 110. FIG. 3 shows that the openings 155 through which gas flows are essentially evenly distributed across the complete inlet wall surface.

It is conceivable also to distribute the openings 155 through which gas flows with an increasing number of openings in the downwards direction across the inlet wall surface 150, i.e. the lower part of the inlet wall surface is provided with more openings than the upper part, in order to supply a larger flow of gas to the input material in the lower region. In order to achieve an even supply of gas to the bed of input material, the openings 155 through which gas flows are arranged such that a predetermined resistance to flow is achieved during the passage of gas through the openings 155, whereby a fall in pressure dP is generated across the openings 155 through which gas flows such that the fall in pressure that is generated across the openings 155 through which gas flows exceeds the fall in pressure of the gas during its passage through the bed of input material.

The bed of input material M is in contact with the inlet wall surface 150 during pyrolysis. The inlet wall surface 150 is heated by the gas that is supplied to the compartment 151 that supplies gas. The gas that is supplied to the chamber through the inlet wall surface 150 passes through the input material M in a downwards direction to the gas outlet means 160 arranged further down on the inner surface 111.1 of the jacket. This is advantageous in particular during an initial phase of the processing when the upper level $M_{start}$ of the input material is located considerably vertically above the upper end 121.2 of the gas distribution pipe and for this reason cannot be efficiently processed by the gas that is supplied from the gas distribution pipe, leading to a shorter processing period. As the processing period continues, the material collapses onto itself and frees an upper part of the inlet wall surface 150. The flow of gas that is supplied through the inlet wall surface 150 to the input material that has been introduced can then be regulated to a lower or higher flow, or it can be interrupted.

One advantage of arranging the inlet wall surface 150 along the jacket 111 is that the heated inert process gas that is supplied through the inlet wall surface 150 can process the input material efficiently, since the flow of gas is led in the direction towards the gas outlet means arranged at the jacket.

It is preferable that the fall in pressure generated across the openings 155 through which gas flows of the inlet wall surface 150 corresponds to the fall in pressure generated across the openings 125 through which gas flows of the gas distribution pipe. The open area of the openings 155 through which gas flows at the inlet wall surface 150 corresponds therefore to the open area of the openings 125 through which gas flows of the gas distribution pipe. The number and distribution across the inlet wall surface of the openings 155 through which gas flows are selected and adapted such that an appropriate distribution of gas across the bed is achieved.

Figure 5:
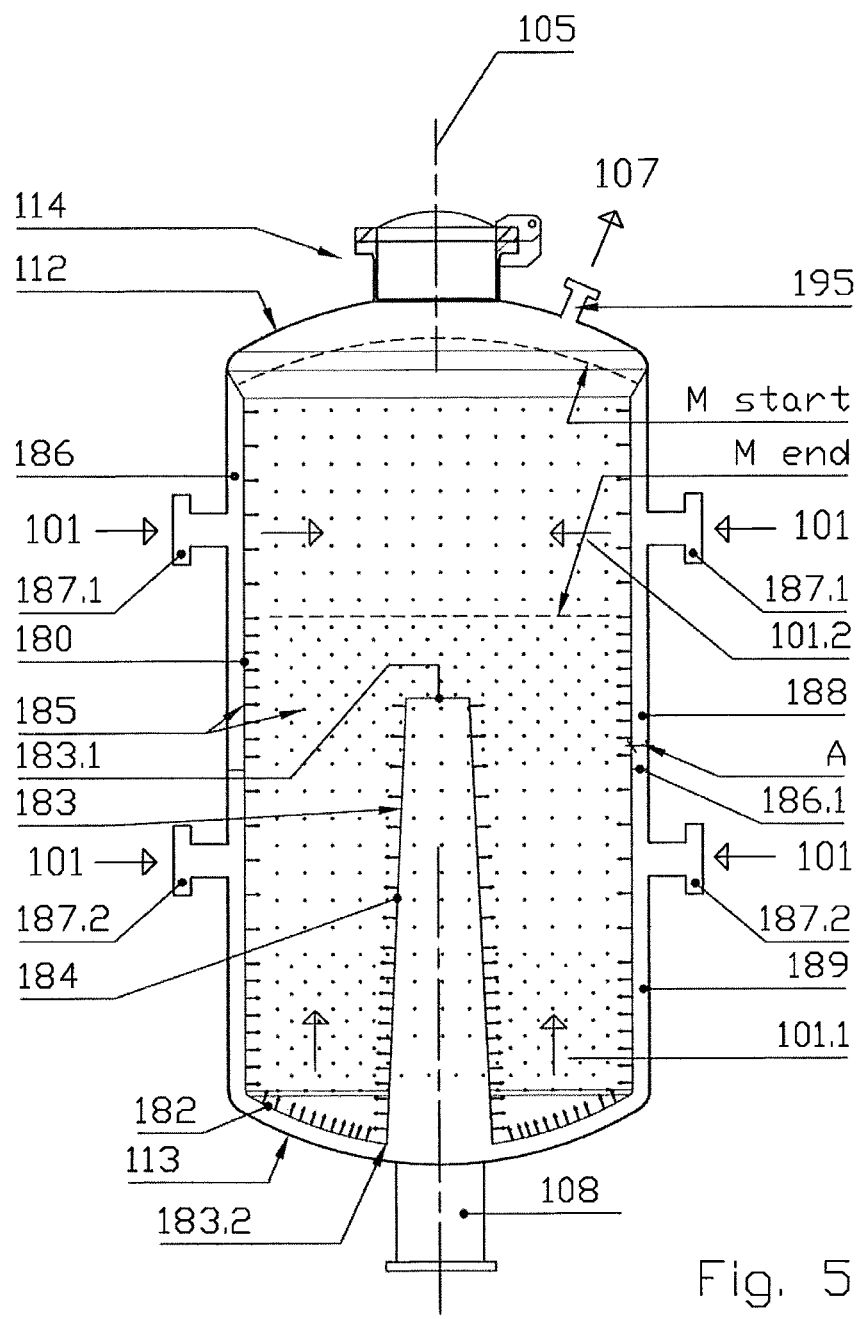
FIG. 5 shows a schematically another embodiment of the reactor in a cut-away view.

FIG. 5 shows a further embodiment of the arrangement according to the invention in which the gas inlet means 120 of the reactor comprises a continuous inlet surface 180 arranged around the complete inner surface of the inner surface 111.1 of the reactor jacket (with the exception of the upper end-wall section) and on the inner surface of the lower end-wall section 113. The gas outlet means 160 of the reactor comprises a gas outlet pipe 195 arranged at the upper end-wall section 112 of the reactor. The continuous inlet wall surface 180 comprises a wall surface 181, a bottom surface 182 and a gas distribution pipe 183.

The gas distribution pipe 183 is arranged coaxially with the central axis 105 of the reactor and extends as a tower axially into the chamber, and has a peripheral surface 184 with a lower end 183.2 connected to the bottom surface 182 and an upper end 183.1 arranged at least half of the height of the reactor in the vertical direction. The bottom surface 182 of the inlet surface is arranged to connect the wall surface 181 with the lower end 183.2 of the gas distribution pipe. The inlet surface 180 is arranged at a distance A from the jacket 111.1 of the reactor and the lower end-wall section 113 such that a compartment 186 that supplies gas is formed between the inlet surface 180 and the jacket 111.1 and the surface of the lower end-wall section 113, respectively, whereby also the inner surface of the gas distribution pipe 183 constitutes a part of the compartment 186 that supplies gas.

The continuous inlet surface 180 is provided with openings 185 through which gas flows to lead heated inert gas into the chamber 110. The openings 185 through which gas flows are distributed across the complete inlet surface 180 and are designed to achieve a resistance to flow such that a fall in pressure is generated across the openings 185 through which gas flows in the same manner as that described previously. The flow of gas is indicated in FIG. 5 by arrows directed into the chamber 110.

Inlet pipes 187.1 and 187.2 are arranged along the jacket 111 to lead inert gas under pressure to the input material M that has been introduced into the chamber 110, indicated with dashed lines $M_{start}$ and $M_{end}$. It is shown in FIG. 5 that the compartment 186 that supplies gas is divided by a dividing wall 186.1 into segments 188, 189 arranged at mutually different levels of height in the chamber; an upper segment 188 and a lower segment 189. The segments 188 and 189 are equipped with separate associated inlet pipes 187.1 and 187.2 arranged at the jacket, in order to lead gas 101 to the relevant segment 188, 189 of the compartment 186 that supplies gas arranged at mutually different levels of height in the chamber (110). The advantage of dividing the compartment that supplies gas is that the possibility to control the flow of gas to different regions in the reactor increases and the processing can in this way be carried out more efficiently. It is, of course, possible that the compartment 186 that supplies gas be designed without a dividing wall or division. The gas that is led into the chamber is then distributed evenly across all of the openings 185 through which gas flows around the complete inlet surface, also the openings 185 through which gas flows arranged in the gas distribution pipe 183.

It is shown in FIG. 5 that the openings 185 through which gas flows are distributed across the inlet wall 180 such that the number of openings 185 increases in the downwards direction across the inlet wall 180, i.e. the lower part of inlet wall has more openings 185 through which gas flows than the upper part, in order to guide a larger fraction of the gas (101) that is supplied to the reactor to the lower part of the chamber than to the upper part of the chamber. This can, of course, take place during different periods of the processing.

The reactor in FIG. 5 demonstrates a gas outlet pipe 195 at the upper end-wall section 112. The gas that is supplied to the input material that has been introduced into the chamber is led out from the chamber 110 through the gas outlet pipe 195. The flow of gas passes in this way through the input material in an upwards direction through the bed of input material, whereby the input material undergoes pyrolysis efficiently. One advantage of the flow of gas being supplied along the complete inlet surface 180 from the bottom surface 182 to the upper end-wall section is that the gas 101.1 (indicated by arrows) that is supplied to the input material M next to the bottom surface 182 of the chamber and that is cooled during its passage through the bed of input material is supplied with heat from the flow of gas 101.2 (indicated by arrows) that is supplied higher up along the continuous inlet surface 180. It is in this way prevented that pyrolysis oil that has been vapourised in the lower part of the reactor and that is carried with the rising gas to the gas outlet pipe 195 recondenses in the input material M during its passage, which improves the quality of the carbon-based residual product.

Outlet means 160 for the removal of gas that has passed through the input material M that has been introduced into the chamber 110 are shown in FIGS. 1 and 3. The flow of gas that is supplied from gas inlet means 120 passes through the input material M and emits heat that it carries, whereby the gas flows in the direction towards the outlet means 160 according to the law of lowest resistance. The purpose of the outlet means 160 is to withdraw the vapourised pyrolysis oil 107 in an efficient manner.

Figure 6:
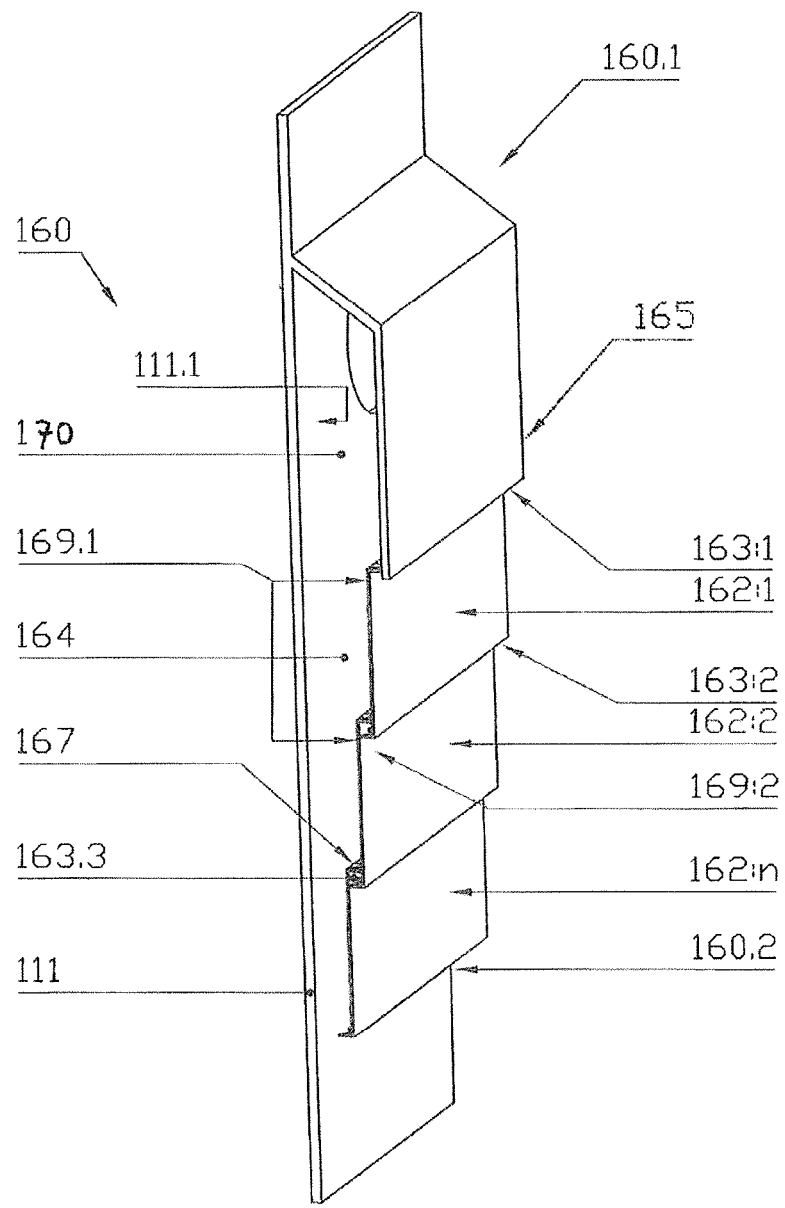
FIG. 6 shows the gas outlet unit in detail.

FIG. 6 shows a detailed view of one section of the outlet means 160, which comprises gas-transfer passages 170.1-170.*n* arranged in the chamber 110 (shown in the drawing as a single channel 170 for reasons of simplicity), outlet surfaces 162.1-162.*n*, gas-guidance gaps 163.1-163.*n*, and a gas-guidance compartment 164. The outlet means 160 comprises also outlet pipes 166 arranged on the outer surface of the reactor jacket that are connected to the gas-transfer passage 170.

The outlet means 160 has an upper end 160.1 that is preferably vertically located below the upper end 121.2 of the gas distribution pipe, and a lower end 160.2 that is arranged next to the bottom plate 130. The outlet means 160 is arranged around the complete inner surface 111.1 of the jacket along at least the lower third of the reactor 1.

The outlet means 160 is designed as an outlet wall surface 165 provided with folds and intended to be in contact with the bed of input material M and formed by a series, at least three or more, of outlet surfaces 162.1-162.*n* arranged below and in direct connection with a channel 170 that transfers gas. Each outlet surface 162.1-162.*n* is turned towards the chamber 110 and demonstrates an upper and a lower edge 169.1, 169.2, respectively. The outlet surface 162.1-162.*n* extends around the complete inner surface of the jacket and is arranged at a distance from the jacket, whereby a compartment 164 that transfers gas is formed between the outlet surface 162.1-162.*n* and the jacket. The outlet surface 162.1-162.*n* is preferably designed as an extended plate-like element of sheet metal that is connected to the inner surface of the jacket. The outlet surfaces 162.1-162.*n* are arranged at mutually different vertical heights in the chamber and at mutually different distances from the jacket. The outlet surfaces 162.1-162.*n* are separated by folds formed by gaps 163.1-163.*n* that transfer gas, where a gap is formed between two outlet surfaces arranged as neighbours to each other: it is shown, for example, in FIG. 6 that gap 163.2 is formed between outlet surfaces 162.1 and 162.2. The gaps 163.1-163.*n* that transfer gas are intended to receive and lead out from the chamber 110 pyrolysis gas 107 that contains vapourised pyrolysis oil released from the input material M. The gap 163.1-163.*n* is arranged horizontally and extends around the complete jacket 111.1, and it has a gap width b that corresponds to the radially directed distance in the chamber between two outlet surfaces arranged next to each other.

It is preferable that the outlet surfaces 162.1-162.$n$ mutually overlap each other in the vertical direction, as is shown in FIG. 6, in order to protect the gaps 163.1-163.$n$ that transfer gas from penetrating particles of input material. The lower edge 169.2 of the outlet surface 162.1 is arranged at a greater distance from the inner surface 111.1 of the jacket than the upper edge 169.1 of the outlet surface 169.2 that is arranged as the next neighbour in the downwards direction, and the lower edge 169.2 of the upper outlet surface 162.1 extends downwards and is arranged at a lower height than the upper edge 169.1 of the lower outlet surface 162.2, such that the lower edge 169.2 of the upper outlet surface 162.1 overlaps in the vertical direction the upper edge of the lower outlet surface. The lower edge surface 169.2 of the upper outlet surface 162.1 protects in this way the gap 163.2 that transfer gas by preventing particles of input material penetrating into the gap during filling of the chamber and during the process period when the input material collapses onto itself.

The gap 163.1-163.$n$ may be equipped also with particle blocking means 167 designed such that particles that are present in the input material are separated from the gas while the gas is allowed to pass freely through the gap 163.1-163.$n$. A particle-blocking means 167 is shown in FIG. 6 designed with a W-shaped or toothed profile that is arranged to extend across the width of the gap 163.1-163.$n$. The particle-blocking means 167 is selected and adapted according to the fragment size of the input material. The particle-blocking means 167 is arranged in one piece with the outlet surface 162.1-162.$n$, whereby the upper and/or the lower edge 169.1, 169.2 of the outlet surface is provided with an appropriate profile and folded in such a manner that the particle-blocking means extends across the complete width of the gap and makes contact with the neighbouring outlet surface. The gap 163.1-163.$n$ is provided in FIG. 6 with double particle-blocking means 167.

The outlet wall surface 165 of the outlet means 160 has several advantageous functions. The gas-transferring compartment 164 that is formed between the outlet surfaces 162.1-162.$n$ and the jacket 111.1 leads pyrolysis gas 107 from the gaps 163.1-163.$n$ that transfer gas along the jacket upwards in the direction towards the channel 170 that transfers gas and the outlet pipe 165. The pyrolysis gas 107, comprising vapourised pyrolysis oil, that is led out through the lower gaps that transfer gas closest to the bottom plate 130 and passes through the compartment 164 that transfers gas in the direction towards the outlet pipe 166 normally has a higher temperature than the flow of pyrolysis gas that has passed through the input material located at a higher level in the reactor where the flow of pyrolysis gas must pass a larger fraction of the input material and is in this way cooled more. This leads to the outlet wall surface 165 being heated by the outwards bound hotter pyrolysis gas 107 that passes through the compartment 164 that transfers gas. The flow of pyrolysis gas that has passed through the input material located at a higher level in the reactor in the direction of the outlet means 160 meets the heated surface 165, whereby the temperature and flow rate of the flow of pyrolysis gas increase and condensation of the vapourised pyrolysis oil in the input material is avoided. This leads to improved properties of the carbon-based end product.

It is shown in FIG. 3 that the compartment 164 of the outlet means that transfers gas is divided into outlet sectors 164.1 and 164.2, where each outlet sector is connected in a manner that transfers gas through a separate associated channel 170.1 and 170.2, respectively, that transfers gas to a separate associated outlet pipe 166.1 and 166.2, respectively, for the withdrawal of pyrolysis gas 107 from the input material. It is preferable that the compartment 164 that transfers gas is divided into four outlet sectors that transfer gas and that are evenly distributed around the jacket. (Only two outlet sectors are shown in FIG. 3.) The compartment 164 that transfers gas may be, for example, provided with dividers or intermediate walls for the separation of the outlet sectors. A divider is indicated in FIG. 3 by a dashed line. Each outlet sector 164.1 and 164.2, respectively, receives pyrolysis gas 107 through the gaps 163.1-163.$n$ that transfer gas and that are arranged within the relevant outlet sector. The outlet sectors 164.1 and 164.2 lead pyrolysis gas 107 from that part of the input material M that is located in a region in the chamber, also known as the "chamber sector", that is a neighbour to the relevant outlet sector, and it is in this way achieved that pyrolysis gas 107 comprising vapourised pyrolysis oil can be removed in a sectorwise manner from the chamber.

It is shown in FIG. 3 that the channels 170.1 and 170.2 are essentially horizontal and arranged next to the upper end 160.1 of the outlet means and that they connect the compartment 164 that transfers gas to the outlet pipes 166.1 and 166.2, respectively, for the withdrawal of the pyrolysis gas 107 from the chamber 110. The outlet pipes 166.1 and 166.2 are arranged at the jacket at the upper end of the outlet means, and it is preferable that the outlet pipes are grouped into two groups arranged at the circumference of the jacket. Alternatively, the outlet pipes are evenly distributed around the circumference in order to lead away the hot process gas. Each one of the outlet pipes 166.1 and 166.2, respectively, is equipped with control means or valves for the control of the flow of gas through the bed of input material. The channels 170.1 and 170.2, respectively, with the associated outlet pipe 166.1 and 166.2, respectively, are arranged to lead pyrolysis gas 107 in a sectorwise manner out of the chamber 110. The direction of flow of the gas 101 that has been supplied through the input material M can in this way be controlled through regulation of the control means, such as valves or other arrangements that regulate flow, comprised within the outlet means 160.

The arrangement according to the invention with the reactor 1 comprises also a control and monitoring circuit with which process parameters for the heated inert gas 101 that is supplied to the chamber 110 through the gas inlet means 120 can be controlled and monitored, and for the pyrolysis gas 107 comprising vapourised pyrolysis oil that is led out from the chamber 110 through the relevant gas outlet means. The arrangement is further provided with sensors and sensor means with the aid of which the various components of the pyrolysis gas 107 and their relative amounts can be measured and analysed, whereby the pyrolysis process is maintained and carried out as long as the input material in the reactor emits pyrolysis gas 107 that comprises predetermined levels of various components, or as long as the temperature of the pyrolysis gas 107 achieves a predetermined level.

The gas inlet means 120 and the associated inlet pipe demonstrate control means such that the supply of gas and the flow of gas to the gas distribution pipe, gas inlet means on the bottom plate and the inlet wall or the inlet wall surface can be monitored, controlled, increased, reduced, interrupted or redirected during the period of the process. For example, the flow of gas that is supplied to the reactor through the upper gas inlet 129 and to the gas distribution pipe 121 may, in an initial phase, be distributed 50/50 such that equal flows of gas are supplied to the upper gas inlet 129 and the gas distribution pipe 121. The flow of gas that is supplied through the upper gas inlet then processes the upper part of the input material. The ratio is changed during the period of the process such that the upper supply of gas is interrupted and the complete flow of gas is supplied through the gas distribution pipe 121 and the bottom plate 130. It is conceivable also to regulate the process by distributing the total flow of gas to the reactor 1 differently to the gas distribution pipes 121, 183, the gas inlet means 120 at the bottom plate 130, and the inlet wall surface 150 or inlet surface 180 such that different falls in pressure dP are achieved over the openings 125, 146, 155, 185 through which gas flows arranged in different regions of the chamber where the gas inlet means are arranged. The gas that is supplied can in this way be distributed and controlled such that the pyrolysis treatment is carried out in an efficient manner, and such input material that has been partially processed and collapsed onto itself can be supplied with more gas than input material in other region.

By designing the reactor chamber 110 with a fixed bottom that cannot be opened it is achieved that the operating conditions can be optimised without it being necessary to take into consideration that the reactor must permit emptying in the conventional manner, for example, through a cover in the bottom of the container. After the end of the pyrolysis process, emptying of the reactor chamber 110 is carried out through the solid carbon-containing end product being removed by suction through a suction-operated removal arrangement that is lowered down through the upper cover 115 that can be opened that is arranged in the upper end-wall section part 112 of the reactor.

The method according to the invention thus achieves that the carbon-based residue in the reactor is free of pyrolysis oil. All fibres are vapourised during the pyrolysis treatment of fragmented tyres in the arrangement.

The material that lies closest to the gas inlet means 120 is vapourised first during the pyrolysis treatment. The bottom plate 130 becomes warm during the process and the pyrolysis treatment takes place most rapidly next to the bottom of the chamber. The input material undergoes pyrolysis and is converted into a porous carbon-based end product. The fall in pressure will initially be lower in the processed region of the input material, after which this region is pressed together, whereby the resistance to flow increases and the gas 101 that is supplied flows towards areas in the bed of input material that have a lower fall in pressure, i.e. the unprocessed material.

The present invention is not limited to what has been described above and shown in the drawings: it can be changed and modified in several different ways within the scope of the attached patent claims.

The invention claimed is:

1. An apparatus for the recycling of carbon and hydrocarbon compounds from organic input material through pyrolysis, said apparatus comprising:
    a reactor (1) comprising a chamber (110) that is limited by a jacket (111) and upper and lower end-wall sections (112, 113) into which an input material (M) in fragmented form can be introduced;
    a gas inlet means (120) for the supply of a heated inert gas (101) to the input material, whereby the gas inlet means (120) is connected in a manner that transfers the heated inert gas (101) from a gas emission source (102) through inlet pipes (104, 129) that are associated with the gas inlet means; and
    a gas outlet means (160) for leading the heated inert gas (101) out of the chamber,
    wherein:
        the gas inlet means (120) comprises: (a) openings (125, 146, 155) through which the heated inert gas (101) flows, the openings (125, 146, 155) being configured to supply the heated inert gas (101) into the chamber (110), and (b) a gas distribution pipe (121) comprising at least one inlet unit (122.1, 122.2) upon which the openings are located,
        the openings (125, 146, 155) through which the heated inert gas (101) flows have a collective open area less than a cross-sectional area of the inlet pipes (104, 129),
        the gas outlet means (160) is designed as an outlet wall surface (165) comprising a series of outlet surfaces (162.1-162.n) arranged at the inner surface (111.1) of the jacket, the outlet surfaces (162.1-162.n) being arranged at mutually different vertical heights in the chamber (110) and at mutually different distances from the jacket (111),
        the gas outlet means (160) further comprises a series of gaps (163.1-163.n) that transfer gas (163.1-163.n) for the leading out of pyrolysis gas (107) from the chamber (110), respective ones of the gaps (163.1-163.n) being formed between respective ones of the outlet surfaces (162.1-162.n) arranged next to each other, and
        the respective ones of the outlet surfaces (162.1-162.n) arranged next to each other mutually overlap each other in the vertical direction in order to protect the gaps (163.1-163.n) that transfer gas from penetrating particles of the input material (M).

2. The apparatus according to claim 1, wherein:
    the gas distribution pipe (121) is centrally arranged and extends axially into the chamber (110), and
    the at least one inlet unit (122.1, 122.2) is configured such that the gas distribution pipe defines a truncated cone.

3. The apparatus according to claim 2, wherein the openings (125) through which gas flows are evenly distributed across the peripheral surface (124) of the gas distribution pipe.

4. The apparatus according to claim 2, wherein the openings (125) through which gas flows are distributed with an increasing number of openings in the downwards direction across the lower end of the gas distribution pipe.

5. The apparatus according to claim 1, wherein the upper end (121.2) of the gas distribution pipe is positioned at higher level than half of the reactor height.

6. The apparatus according to claim 1, wherein the openings (125, 155) through which gas flows are arranged to prevent penetration of the input material (M) into the gas inlet means (120), whereby each opening (125, 155) through which the heated inert gas (101) flows demonstrates an upper protruding edge part (125.1) and a lower withdrawn edge part (125.2).

7. The apparatus according to claim 1, wherein:
    the chamber (110) demonstrates a bottom plate (130) configured to support the input material (M), and
    the bottom plate (130) has an internal peripheral edge (132) that surrounds the lower end (121.1) of the gas distribution pipe and an external peripheral edge (131) connected to the inner surface (111.1) of the jacket, and a compartment formed between the lower end-wall section (113) and the bottom plate (130).

8. The apparatus according to claim 7, wherein the bottom plate (130) comprises the gas inlet means (120).

9. The apparatus according to claim 8, wherein the gas inlet means (120) comprises slits (137) that transfer gas arranged along the peripheral edge (131) of the bottom plate.

10. The apparatus according to claim 1, wherein the gas inlet means (120) comprises gas line arrangements (140) located on a bottom of the reactor and demonstrating at least one opening (146), through which the heated inert gas (101) flows, arranged such that the heated inert gas (101) can in an unimpeded manner be supplied to the input material (M) that has been introduced into the chamber (110).

11. The apparatus according to claim 10, wherein each gas line arrangement (140) demonstrates an upper surface (144) facing into the chamber (110) and a lower surface (145) comprising the at least one opening (146) through which gas flows directed towards a bottom plate (130).

12. The apparatus according to claim 7, wherein a lowermost of the at least one inlet unit (122.1, 122.2) and the gas inlet means (120) arranged at the bottom plate (130) have a common inlet pipe (104.1) for the supply of the heated inert gas (101) from the gas emission source (102).

13. The apparatus according to claim 1, wherein:
the gas inlet means (120) comprises an inlet wall surface (150) arranged at the inner surface (111.1) of the jacket and a compartment (151) that supplies gas and is formed between the inlet wall surface and the jacket, and
openings (155) through which gas flows are arranged at the inlet wall surface (150) for the supply of gas to the input material (M) that has been introduced into the chamber.

14. The apparatus according to claim 13, wherein the inlet wall surface (150) has an upper end (150.1) arranged at the jacket (111) next to the upper end-wall section (112), and a lower end (150.2) arranged in connection with the gas outlet means (160).

15. The apparatus according to claim 13, wherein the inlet wall surface (150) has an upper end (150.1) arranged at the jacket (111.1) next to the upper end-wall section (112), and a lower end arranged in connection with a bottom plate (130).

16. The apparatus according to claim 13, wherein the total area of the openings (155) through which gas flows arranged at the inlet wall surface (150) corresponds to the total area of the openings (125) through which gas flows arranged at the peripheral surface (124) of the gas distribution pipe (124).

17. The apparatus according to claim 13, wherein the openings (155) through which gas flows are evenly distributed across the inlet wall surface (150).

18. The apparatus according to claim 13, wherein the openings (155) through which gas flows are distributed with an increasing number of openings in the downwards direction across the inlet wall surface (150).

19. The apparatus according to claim 1, wherein:
a compartment (186) that supplies gas comprises segments (188, 189) is arranged at mutually different levels of height in the chamber (110), and
separate associated inlet pipes (187.1, 187.2) are configured to lead the heated inert gas (101) to the segments (188, 189) in the compartment (186) that supplies the heated inert gas (101).

20. The apparatus according to claim 19, wherein openings (185) through which gas flows are distributed with an increasing number of openings (185) in the downwards direction across the inlet surface (180) closer to the lower end of each segment (188, 189).

21. The apparatus according to claim 1, wherein:
each outlet surface (162.1-162.n) extends around the complete inner surface (111.1) of the jacket and is arranged at a distance from the jacket (111), and
a compartment (164) that transfers gas is formed between the outlet surface (162.1-162.n) and the jacket (111).

22. The apparatus according to claim 21, wherein:
the compartment (164) that transfers gas out is divided into outlet sectors (164.1, 164.2) that transfer gas out, and
each outlet sector (164.1, 164.2) leads pyrolysis gas (107) out from the input material (M) that is located in a region of the chamber that is adjacent to the outlet sector (164.1, 164.2).

23. The apparatus according to claim 22, wherein:
the gas outlet means (160) comprises passages (170.1, 170.2) that transfer gas arranged horizontally along the inner surface (111.1) of the jacket, and
each outlet sector (164.1, 164.2) is connected in a manner that transfers gas through a separate associated channel (170.1, 170.2) that transfers gas to a separate associated outlet pipe (166.1, 166.2) for the leading of pyrolysis gas (107) out from the chamber (110).

24. The apparatus according to claim 1, wherein:
the upper end of the gas outlet means (160) is positioned, in the vertical direction, below the upper end (121.2) of the gas distribution pipe, and
the lower end of the gas outlet means (160) is connected to a bottom plate (130) next to the lower end-wall section (113) of the reactor.

25. The apparatus according to claim 1, wherein the gas outlet means (160) comprises a gas outlet pipe (195) positioned at the upper end-wall section (112) of the reactor jacket.

26. An apparatus for the recycling of carbon and hydrocarbon compounds from organic input material through pyrolysis, said apparatus comprising:
a reactor (1) comprising a chamber (110) that is limited by a jacket (111) and upper and lower end-wall sections (112, 113) into which an input material (M) in fragmented form can be introduced;
a gas inlet means (120) for the supply of a heated inert gas (101) to the input material (M), whereby the gas inlet means (120) is connected in a manner that transfers the heated inert gas (101) from a gas emission source (102) through inlet pipes (104, 129) that are associated with the gas inlet means; and
a gas outlet means (160) for leading the heated inert gas (101) out of the chamber,
wherein:
the chamber (110) demonstrates a bottom plate (130) configured to support the input material (M),
the bottom plate (130) has an internal peripheral edge (132) that surrounds the lower end (121.1) of a gas distribution pipe (121) and an external peripheral edge (131) connected to the inner surface (111.1) of the jacket, and a compartment formed between the lower end-wall section (113) and the bottom plate (130);
the bottom plate (130) comprises the gas inlet means (120) comprising at least one opening (146) through which the heated inert gas (101) can be supplied into the chamber (110),
the at least one opening (146) through which the heated inert gas (101) flows has a total open area less than a cross-sectional area of the inlet pipes,
the gas outlet means (160) is designed as an outlet wall surface (165) comprising a series of outlet surfaces (162.1-162.n) arranged at the inner surface (111.1) of the jacket, the outlet surfaces (162.1-162.n) being arranged at mutually different vertical heights in the chamber (110) and at mutually different distances from the jacket (111), the gas outlet means (160) further comprises a series of gaps (163.1-163.n) that transfer gas (163.1-163.n) for the leading out of pyrolysis gas (107) from the chamber (110), respective ones of the gaps (163.1-163.n) being formed between respective ones of the outlet surfaces (162.1-162.n) arranged next to each other, and the respective ones of the outlet surfaces (162.1-162.n) arranged next to each other mutually overlap each other in the vertical direction in order to protect the gaps (163.1-163.n) that transfer gas from penetrating particles of the input material (M).

27. The apparatus according to claim 26, wherein the gas inlet means (120) comprises gas line arrangements (140) located on a bottom of the reactor, and each of the gas line arrangements (140) demonstrates an upper surface (144) facing into the chamber (110) and a lower surface (145) comprising the at least one opening (146) through which gas flows directed towards the bottom plate (130).

28. The apparatus according to claim 26, wherein:
each outlet surface (162.1-162.n) extends around the complete inner surface (111.1) of the jacket and is arranged at a distance from the jacket (111), and
a compartment (164) that transfers gas is formed between the outlet surface (162.1-162.n) and the jacket (111).

29. An apparatus for the recycling of carbon and hydrocarbon compounds from organic input material through pyrolysis, said apparatus comprising:
a reactor (1) comprising a chamber (110) that is limited by a jacket (111) and upper and lower end-wall sections (112, 113) into which an input material (M) in fragmented form can be introduced;
a gas inlet means (120) for the supply of a heated inert gas (101) to the input material, whereby the gas inlet means (120) is connected in a manner that transfers the heated inert gas (101) from a gas emission source (102) through inlet pipes (104, 129) that are associated with the gas inlet means; and
a gas outlet means (160) for leading the heated inert gas (101) out of the chamber,
wherein:
the gas inlet means (120) comprises: (a) openings (125, 146, 155) through which the heated inert gas (101) flows, the openings being configured to supply the heated inert gas (101) into the chamber (110), and (b) a gas distribution pipe (121) comprising at least one inlet unit (122.1, 122.2) upon which the openings are located,
the openings (125, 146, 155) through which the heated inert gas (101) flows have a collective open area less than a cross-sectional area of the inlet pipes (104, 129),
the gas outlet means (160) is designed as an outlet wall surface (165) comprising a series of outlet surfaces (162.1-162.n) arranged at the inner surface (111.1) of the jacket, the outlet surfaces (162.1-162.n) being arranged at mutually different vertical heights in the chamber (110) and at mutually different distances from the jacket (111),
the gas outlet means (160) further comprises a series of gaps (163.1-163.n) that transfer gas for the leading out of pyrolysis gas (107) from the chamber (110), respective ones of the gaps (163.1-163.n) being formed between respective ones of the outlet surfaces (162.1-162.n) arranged next to each other, and
each gap (163.1-163.n) that transfers gas is equipped with particle-blocking means (167) arranged to be extended across of the width of the gap such that any input material (M) that is carried by gas is separated from the pyrolysis gas (107), while the pyrolysis gas is allowed to pass freely through the gap (163.1-163.n).

30. The apparatus according to claim 29, wherein:
the gas distribution pipe (121) is centrally arranged and extends axially into the chamber (110),
the inlet units (122.1, 122.2) are configured such that the gas distribution pipe defines a truncated cone, and
the openings (125) through which gas flows are distributed with an increasing number of openings in the downwards direction across the lower end of the gas distribution pipe.

31. The apparatus according to claim 29, wherein the openings (125, 155) through which gas flows are arranged to prevent penetration of the input material (M) into the gas inlet means (120), whereby each opening (125, 155) through which the heated inert gas (101) flows demonstrates an upper protruding edge part (125.1) and a lower withdrawn edge part (125.2).

32. The apparatus according to claim 29, wherein the gas inlet means (120) comprises gas line arrangements (140) located on a bottom of the reactor and demonstrating at least one opening (146), through which the heated inert gas (101) flows, arranged such that the heated inert gas (101) can in an unimpeded manner be supplied to the input material (M) that has been introduced into the chamber (110).

33. The apparatus according to claim 29, wherein:
the gas inlet means (120) comprises an inlet wall surface (150) arranged at the inner surface (111.1) of the jacket and a compartment (151) that supplies gas and is formed between the inlet wall surface (150) and the jacket, and
openings (155) through which gas flows are arranged at the inlet wall surface (150) for the supply of gas to the input material (M) that has been introduced into the chamber.

34. The apparatus according to claim 29, wherein:
a compartment (186) that supplies gas comprises segments (188, 189) is arranged at mutually different levels of height in the chamber (110),
separate associated inlet pipes (187.1, 187.2) are configured to lead the heated inert gas (101) to the segments (188, 189) in the compartment (186) that supplies the heated inert gas (101), and
openings (185) through which gas flows are distributed with an increasing number of openings (185) in the downwards direction across the inlet surface (180) closer to the lower end of each segment (188, 189).

35. An apparatus for the recycling of carbon and hydrocarbon compounds from organic input material through pyrolysis, said apparatus comprising:
a reactor (1) comprising a chamber (110) that is limited by a jacket (111) and upper and lower end-wall sections (112, 113) into which an input material (M) in fragmented form can be introduced;
a gas inlet means (120) for the supply of a heated inert gas (101) to the input material (M), whereby the gas inlet means (120) is connected in a manner that transfers the heated inert gas (101) from a gas emission source (102) through inlet pipes (104, 129) that are associated with the gas inlet means; and a gas outlet means (160) for leading the heated inert gas (101) out of the chamber, wherein:

the chamber (110) demonstrates a bottom plate (130) configured to support the input material (M), the bottom plate (130) has an internal peripheral edge (132) that surrounds the lower end (121.1) of a gas distribution pipe (121) and an external peripheral edge (131) connected to the inner surface (111.1) of the jacket, and a compartment formed between the lower end-wall section (113) and the bottom plate (130);

the bottom plate (130) comprises the gas inlet means (120) comprising at least one opening (146) through which the heated inert gas (101) can be supplied into the chamber (110), the at least one opening (146) through which the heated inert gas (101) flows has a total open area less than a cross-sectional area of the inlet pipes, the gas outlet means (160) is designed as an outlet wall surface (165) comprising a series of outlet surfaces (162.1-162.n) arranged at the inner surface (111.1) of the jacket, the outlet surfaces (162.1-162.n) being arranged at mutually different vertical heights in the chamber (110) and at mutually different distances from the jacket (111), the gas outlet means (160) further comprises a series of gaps (163.1-163.n) that transfer gas for the leading out of pyrolysis gas (107) from the chamber (110), respective ones of the gaps (163.1-163.n) being formed between respective ones of the outlet surfaces (162.1-162.n) arranged next to each other, and each gap (163.1-163.n) that transfers gas is equipped with particle-blocking means (167) arranged to be extended across of the width of the gap such that any input material (M) that is carried by gas is separated from the pyrolysis gas (107), while the pyrolysis gas is allowed to pass freely through the gap (163.1-163.n**).

36. The apparatus according to claim 35, wherein the gas inlet means (120) comprises gas line arrangements (140) located on a bottom of the reactor, and each of the gas line arrangements (140) demonstrates an upper surface (144) facing into the chamber (110) and a lower surface (145) comprising the at least one opening (146) through which gas flows directed towards the bottom plate (130).

37. The apparatus according to claim 35, wherein:

each outlet surface (162.1-162.n) extends around the complete inner surface (111.1) of the jacket and is arranged at a distance from the jacket (111), and a compartment (164) that transfers gas is formed between the outlet surface (162.1-162.n) and the jacket (111).

* * * * *